United States Patent [19]
Shimizu et al.

[11] Patent Number: 5,196,977
[45] Date of Patent: Mar. 23, 1993

[54] TAPE GUIDE MECHANISM FOR RECORDING AND REPRODUCING DEVICE

[75] Inventors: Hirokazu Shimizu, Chigasaki; Kyuichirou Nagai, Fujisawa; Kenji Ogiro, Yokohama, all of Japan

[73] Assignee: Hitachi, Ltd., Tokyo, Japan

[21] Appl. No.: 658,257

[22] Filed: Feb. 20, 1991

[30] Foreign Application Priority Data

Feb. 21, 1990 [JP] Japan ................................. 2-038212

[51] Int. Cl.⁵ ............................................. G11B 15/60
[52] U.S. Cl. ............................................. 360/130.220
[58] Field of Search ..................... 360/130.22, 130.23, 360/84-85

[56] References Cited
U.S. PATENT DOCUMENTS 3,123,272  3/1964  Pollaschek ..................... 360/130.23
4,338,641  7/1982  Sato .
4,511,943  4/1985  Fechner ......................... 360/130.23

FOREIGN PATENT DOCUMENTS 607266  4/1978  U.S.S.R. ......................... 360/130.23

Primary Examiner—A. J. Heinz
Attorney, Agent, or Firm—Antonelli, Terry, Stout & Kraus

[57] ABSTRACT

A tape guide mechanism for a VTR includes a pair of first guides disposed respectively at a tape entrance side and a tape exit side of a cylinder and positioned immediately adjacent to the cylinder, a pair of second guides disposed adjacent to the pair of first guides, respectively, and a third guide provided in a path of travel of a tape extending between the first guides and the second guides, so as to prevent opposed surfaces of the tape, disposed respectively at the tape entrance side and the tape exit side, from being contacted with each other. The third guide may be of a rotary type and be disposed more remote from the cylinder than the first guides.

4 Claims, 7 Drawing Sheets

TAPE GUIDE MECHANISM FOR RECORDING AND REPRODUCING DEVICE

BACKGROUND OF THE INVENTION

This invention relates generally to a recording and reproducing device in which a tape is wound or extended around a cylinder over a wide angle, and, more particularly, to a tape guide mechanism for such a recording and reproducing device which prevents opposed tape surfaces, disposed in a vicinity of tape guides adjacent to a tape entrance side and a tape exit side of the cylinder, from contacting each other, and which ensures a stable travel of the tape.

Conventionally, in a magnetic recording and, more reproducing device of the rotary head-type (hereinafter referred to as "VTR") and particularly, to a VTR with an integral camera, a system has been proposed in which, in order to obtain a compact and lightweight construction of the device and also to achieve the compatibility (which enables the use of the same format) of this device with other conventional devices, the reduction of the diameter of the cylinder is achieved by increasing the angle of winding of a tape around the cylinder.

For example, Japanese Patent Unexamined Publication No. 58-101579 discloses a small-diameter cylinder system for a VTR of the β type. In this technique, one-head system is adopted for the purpose of reducing the diameter of the cylinder, and in order to obtain the same format as that of a conventional two-head system in which the angle of winding of a tape around a cylinder is 180°, the angle of winding of a tape around the cylinder is increased or widened to 300°. In this case, since the rotational frequency of the cylinder is 60 r.p.s., a vertical scanning speed of the camera is unaltered; however, since the angle of winding of the tape around the cylinder is as small as 300°/360°, an effective horizontal scanning must be completed during a period corresponding to 300°, and signals are recorded with the compression of the time performed about 20% in the horizontal direction. Recently, there has been an increasing demand for VTRs with an integral camera, and therefore the device tends to become more and more compact and, lightweight, and in order to meet a demand for a low cost construction now attainable by a rapid development of memories, there have been proposed small-diameter cylinder systems capable of recording and reproduction which incorporate memories specially designed for compressing and expanding the horizontal scanning speed.

In the above system, in order to achieve a more compact and lightweight construction of the device, it is necessary to reduce the number of the memories as much as possible so as to achieve the low cost design, and it is also necessary to reduce the diameter of the cylinder as much as possible, in which case the tape winding angle is required to be as close to 360° as possible.

As shown in FIG. 7, a cassette 2 contains a magnetic tape 1 wound on a supply reel 2a and a take-up reel 2b. The magnetic tape 1 is wound around the cylinder 3 over an angle of not less than 300°, and therefore, as shown in FIG. 8 in the loading-completed condition, that portion of the tape 1 disposed in a tape path 1a extending between first and second guides 5 and 7 at the entrance side of the cylinder 3 is very close, as shown in FIG. 9, to that portion of the tape 1 disposed in a tape path 1b extending between first and second guides 6 and 8 at the exit side of the cylinder 3.

A first problem with the above-described system resides in the fact that, in the tape loading-completed condition, the guides 5 and 6 as well as the guides 7 and 8 are disposed very close to each other at the entrance side and exit side of the cylinder 3. In this condition, when the tape 1 is in a stop mode, the tension of the tape 1 is reduced, so that the tape 1 is loosened. As a result, the opposed portions of the tape 1 disposed respectively in the tape paths 1a and 1b are brought into contact with each other.

Yet another problem arises in that, even when the tape 1 is subjected to a predetermined tension during a travel thereof, the distribution of the tension in the direction of the width of the tape 1 may become uneven because of irregularities of mounting of the guides, in which case the tape 1 travels with its upper edge portion loosened. As a result, the opposed portions of the tape 1 respectively disposed in the tape paths 1a and 1b are brought into contact with each other, as in the stop mode.

SUMMARY OF THE INVENTION

With the above problems in mind, it is an object of this invention to provide a tape guide mechanism for a recording and reproducing device, having a tape loading mechanism for winding a tape around a cylinder over a wide angle, in which, in the guides respectively disposed at a tape entrance side and a tape exit side of the cylinder, opposed surfaces of the tape are prevented from being contacted with each other, and the loosening of the tape can be restrained, thereby enabling a stable travel of the tape.

In order to achieve the above object, according to the present invention, there is provided a tape guide mechanism comprising a pair of first guides respectively disposed at a tape entrance side and a tape exit side of a cylinder and positioned immediately adjacent to the cylinder, a pair of second guides disposed adjacent to the pair of first guides, respectively, and a third guide provided in a path of travel of a tape extending between the first guides and the second guides, so as to prevent opposed surfaces of the tape from contacting each other. With this construction, when, because of the distribution of the tension of the tape, the tape travels with its upper edge portion loosened, or when the tension of the tape is reduced at the time of stopping the tape, so that the entire tape is loosened, the displacement of the tape in the direction of the thickness thereof is restrained. Opposed surfaces of the tape, disposed in the vicinity of the guides at the tape entrance side and the tape exit side of the cylinder, are easily and certainly prevented from contacting each other.

DETAILED DESCRIPTION OF PREFERRED EMBODIMENTS

Figure 1:
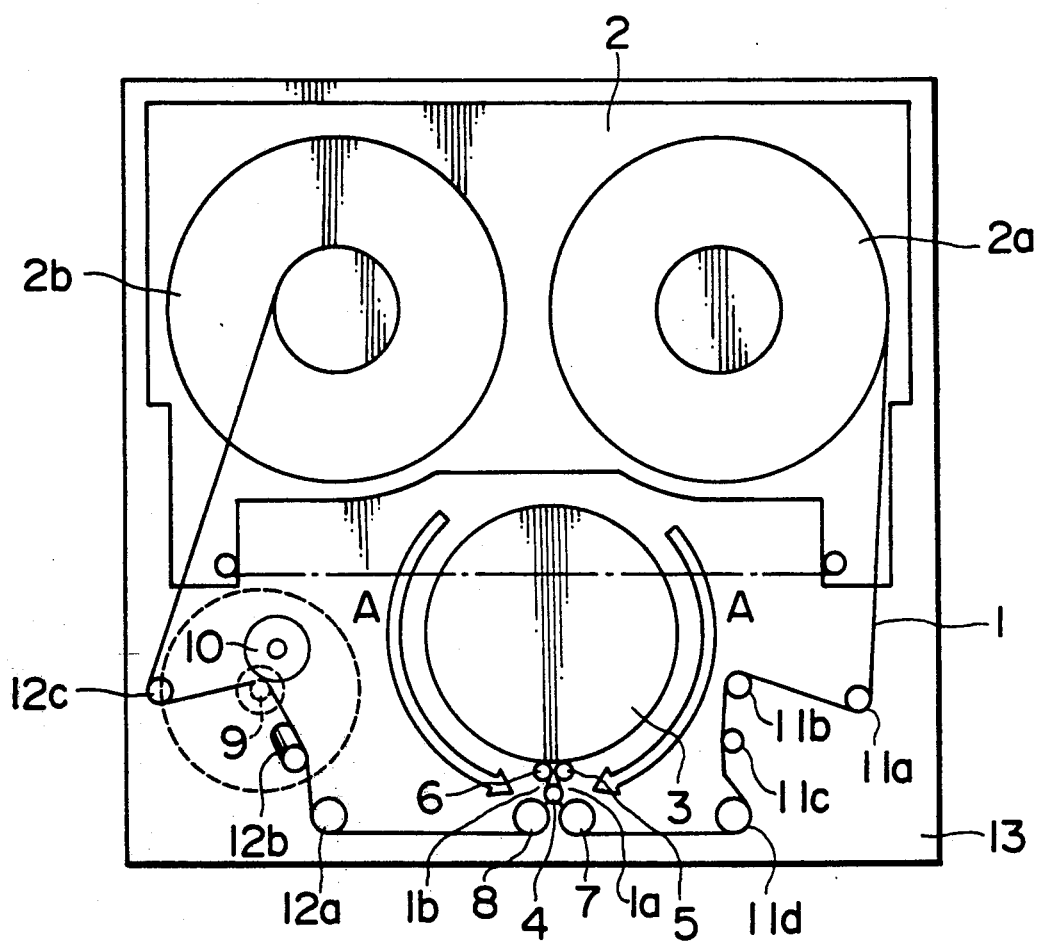
FIG. 1 is a plan view of a recording and reproducing device incorporating a tape guide mechanism according to the present invention.
Figure 2:
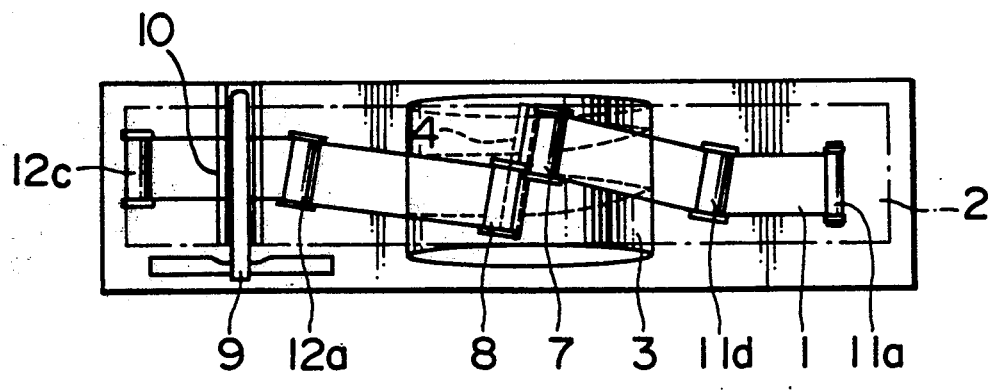
FIG. 2 is a side-elevational view of the recording and reproducing device of FIG. 1.
Figure 3:
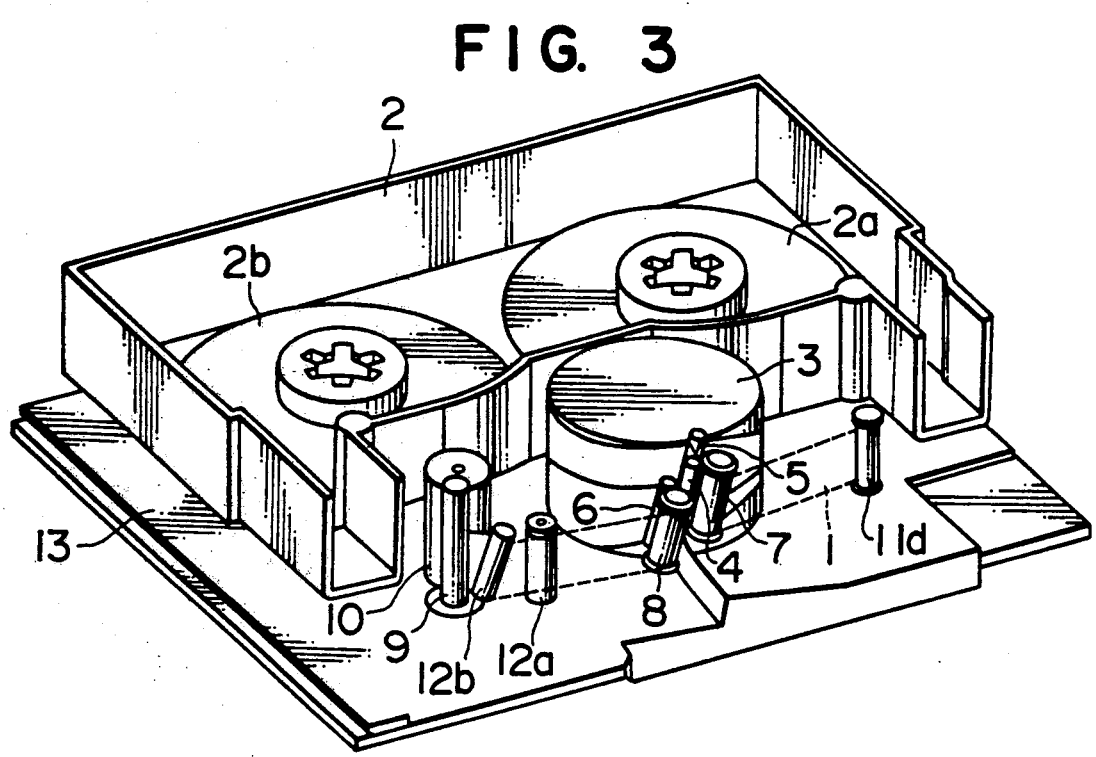
FIG. 3 is a perspective view of the recording and reproducing device of FIG. 1.
Figure 4:
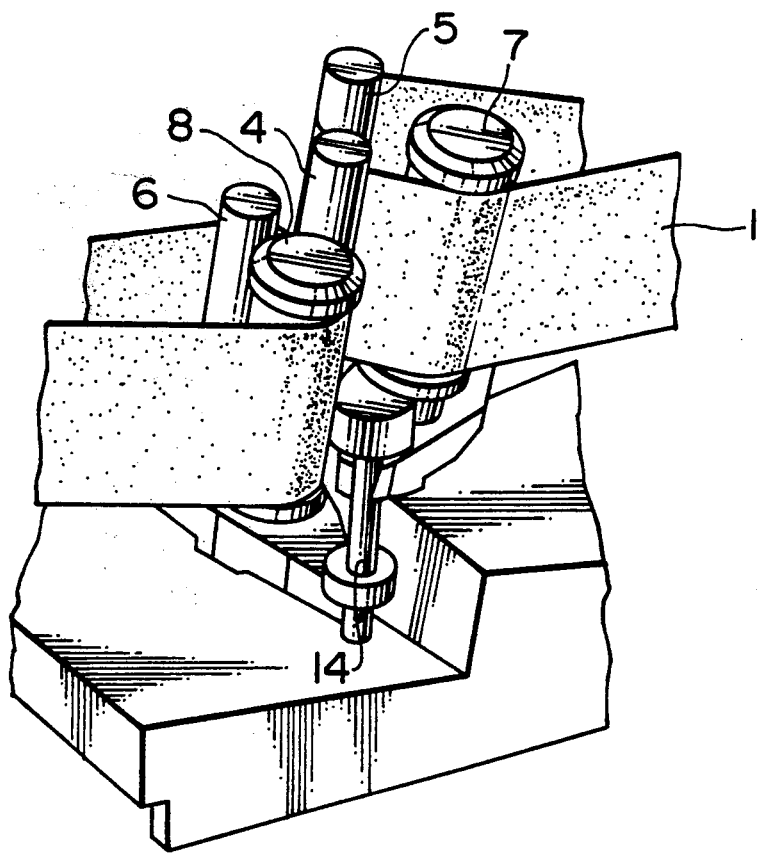
FIG. 4 is a perspective view showing the tape guide mechanism according to the invention.

Referring now to the drawings wherein like reference numerals are used throughout the various views to designate like parts and, more particularly, to FIG. 1-3, according to these figures, a magnetic recording and reproducing device according to the present invention is provided with a third guide member 4 of a cylindrical shape arranged so as to prevent a portion of the tape 1, disposed in a tape path 1a, extending between a first guide 5 near to the cylinder 3 and a second guide 7 from contacting a portion of the tape disposed in a tape path 1b extending between a first guide 6 near to the cylinder 3 and a second guide 8. More specifically, the third guide 4 is provided between the first guides 5 and 6 and the second guides 7, 8. Guides 11a, 11b, 11c, 11d are provided to form a tape path at a tape entrance side of the cylinder 3, and guides 12a, 12b, and 12c are provided to form a tape path at a tape exit side of the cylinder 3. The magnetic recording and reproducing device further includes a capstan 9, a pinch roller 10 and a chassis 13.

Figure 5:
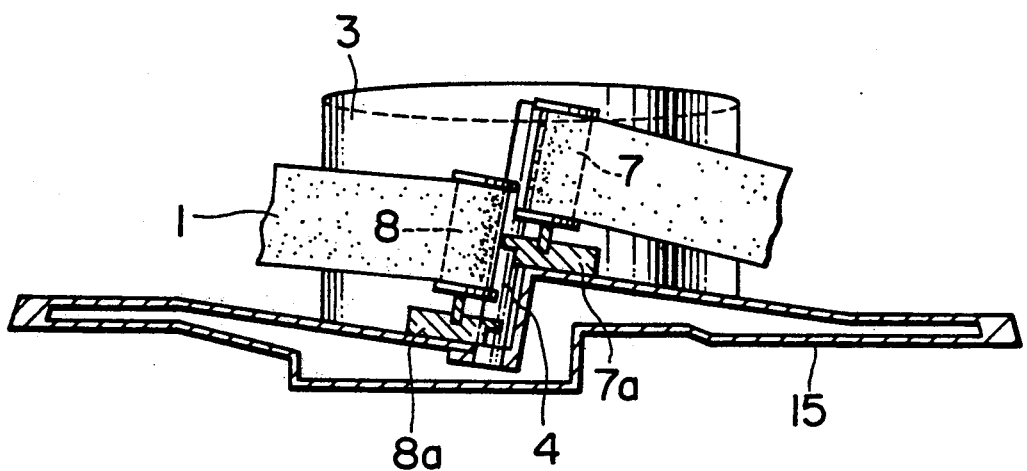
FIGS. 5 and 6 are side-elevational partial cross-sectional views, on an enlarged scale, showing the tape guide mechanism.
Figure 6:
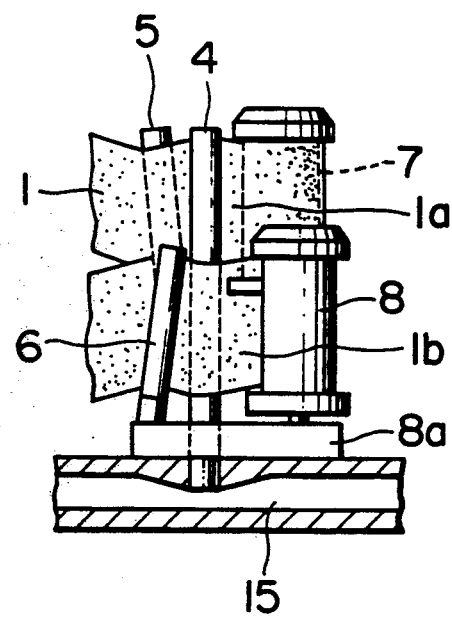
Figure 7:
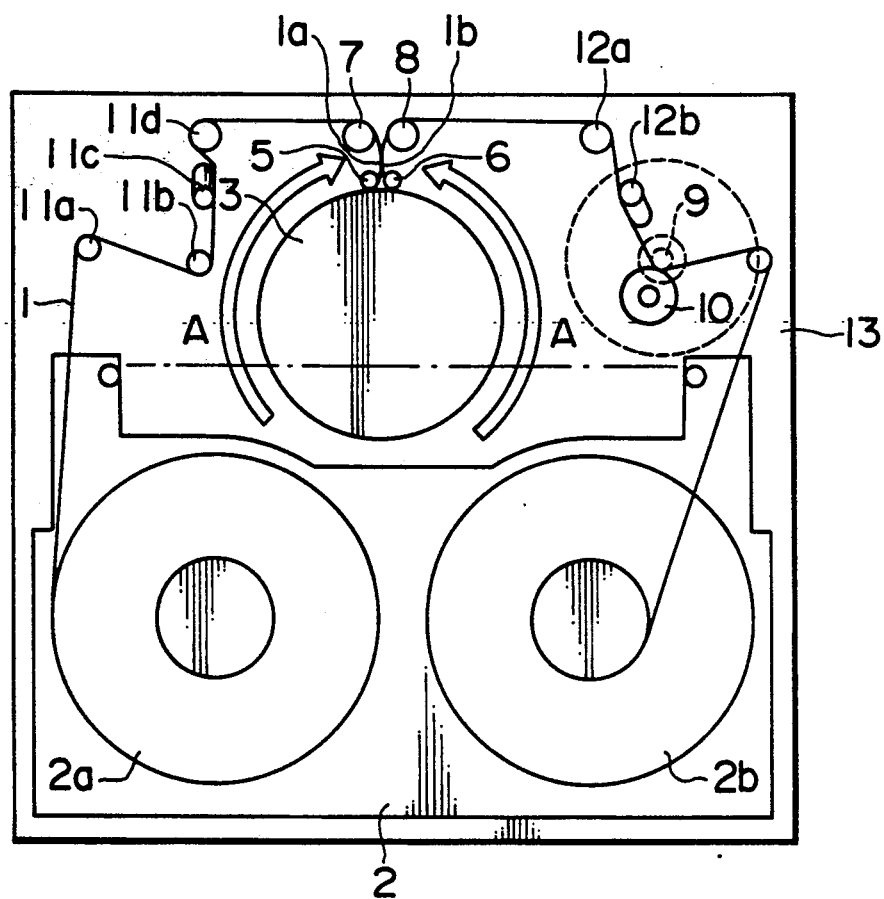
FIG. 7 is a plan view of a prior art construction.
Figure 8:
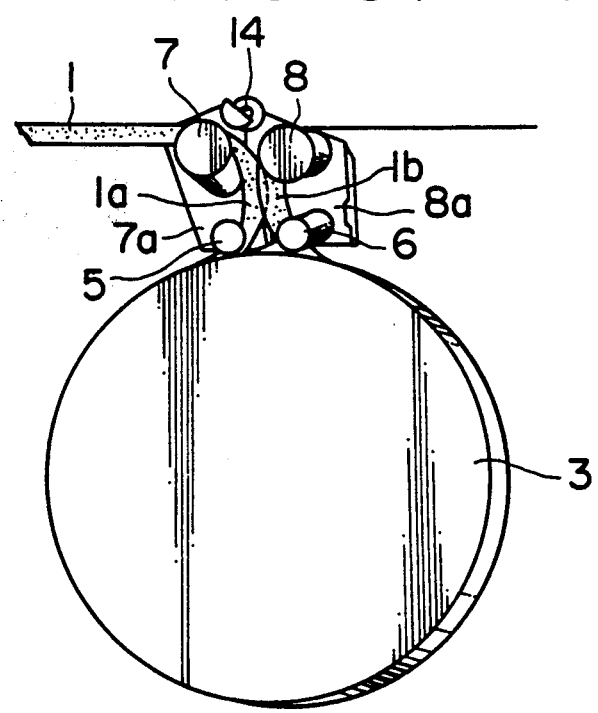
FIG. 8 is a schematic perspective view of a prior art construction.
Figure 9:
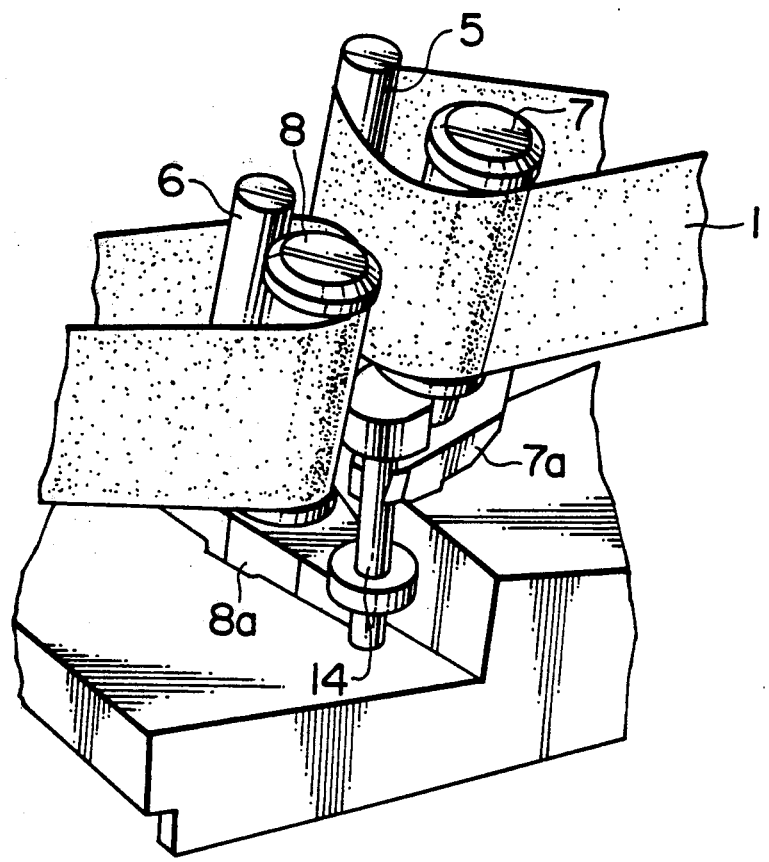
FIG. 9 is a perspective view, on an enlarged scale, of the construction of FIG. 8.

FIG. 1 shows a tape loading-completed condition in which in a recording mode or a reproducing (playback) mode, the tape 1 in a cassette 2 has been pulled out along a loading path A and has been wound around the cylinder 3 over a wide angle slightly less than 360°. As shown in FIGS. 5 and 6, the opposed portions of the tape 1 respectively disposed in the tape paths 1a and 1b are contacted respectively with the opposite sides of the third guide 4 partially embedded in a guide plate 15, and are extended or wound around the third guide 4 over a predetermined angle. When the tape 1 is maintained in the condition shown in FIG. 1, the loosening of the tape which develops in the tape paths 1a and 1b (FIGS. 7, 8 and 9) in the tension-reduced condition in the stop mode in the tape loading-completed condition, as well as the loosening of the tape developing when limiting the travel of the traveling tape, is absorbed, and as a result the opposed portions of the tape 1 disposed respectively in the tape paths 1a and 1b are prevented from being contacted with each other. Also, when the tape 1 travels for recording signals on the tape or reproducing the signals therefrom, the opposed portions of the tape 1 are contacted with the opposite sides of the third guide 4, respectively, and therefore the displacement of the tape 1 in the direction of the width thereof is restrained, thereby ensuring a stable travel of the tape 1.

Figure 10:
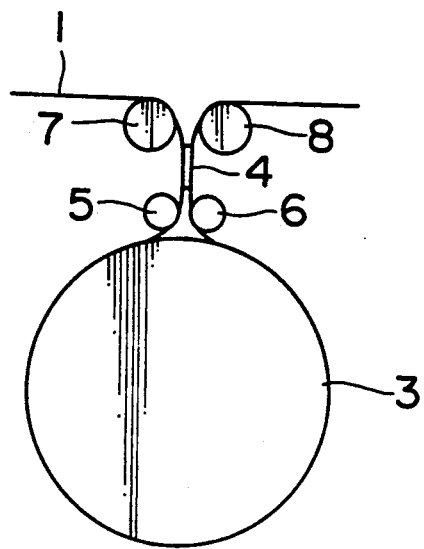
FIGS. 10 and 11 are schematic views of a third guide used in the tape guide mechanism of the present invention.
Figure 11:
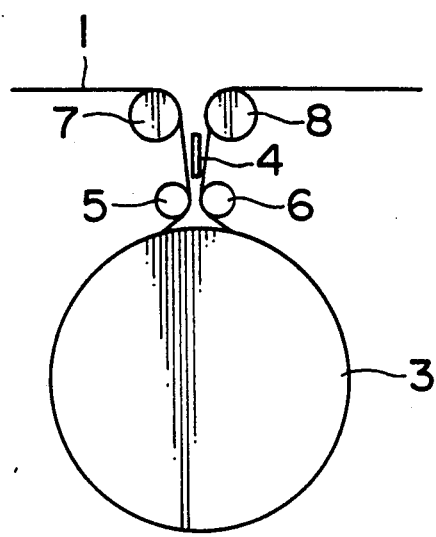
Figure 12:
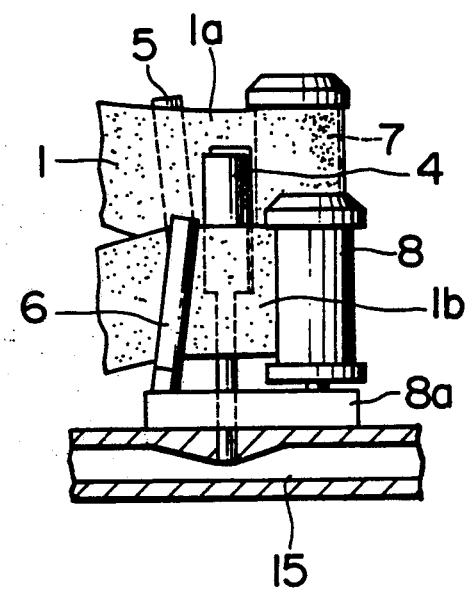
FIG. 12 is a partial cross-sectional view, on an enlarged scale, of the guide of FIG. 11.

Referring to the third guide 4 of a flattened shape, when the tape 1 is in the stop mode in the loading-completed condition as shown in FIG. 10, opposed surfaces of the tape 1 are prevented by the third guide 4 of a flattened shape from contacting each other. When the tape 1 travels under a predetermined tension as shown in FIG. 11, the opposed portions of the tape 1 are hardly brought into contact with each other therefore, it is necessary to reduce the traveling load of the tape 1, and the tape 1 travels without contacting the third guide 4.

Figure 13:
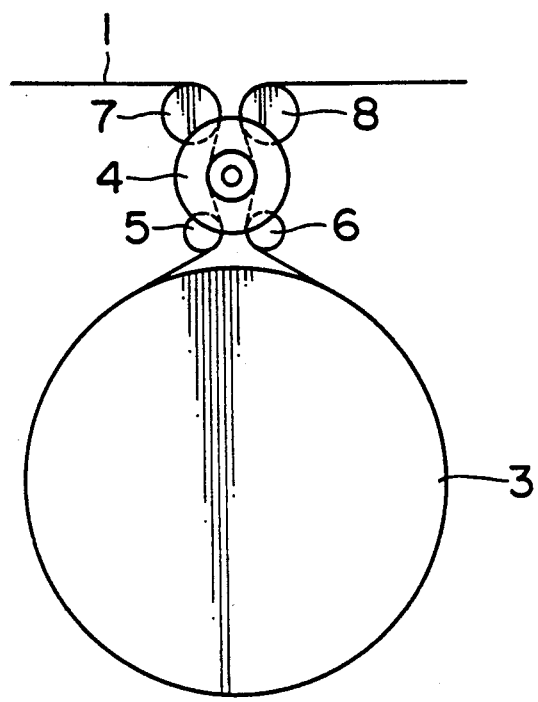
FIG. 13 is a schematic view of yet another embodiment of a third guide used in a tape guide mechanism of the present invention.
Figure 14:
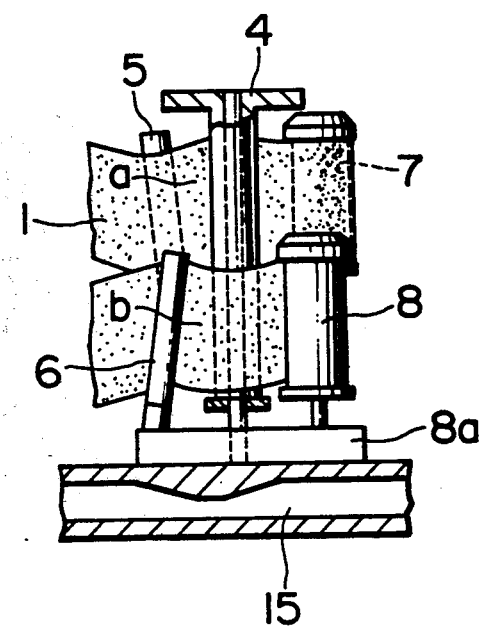
FIG. 14 is a partial cross-sectional view, on an enlarged scale, of the third guide pin of FIG. 13.

The third guide 4 of a rotary roller-shape is contacted with opposed surfaces of the tape 1 at tape paths 1a and 1b, as shown in FIGS. 13 and 14, and is rotated in response to the travel of the tape 1. With this construction, the traveling load of the tape 1 is reduced, and also the loosening of the tape which would develop in the tension-reduced condition as in the stop mode, as well as the loosening of the tape which would develop when limiting the travel of the traveling tape, can be absorbed, thereby preventing the opposed portions of the tape, disposed respectively in the tape paths 1a and 1b, from contacting each other. Also, when the tape 1 travels for recording signals on the tape or reproducing the signals therefrom, the opposed portions of the tape 1 travel while contacting the opposite sides of the third guide 4, respectively, and, since the third guide 4 has a rotary roller-shape, the fluctuation (i.e., uneven travel) of the tape in its longitudinal direction can be restrained, thus achieving the effect of reducing the jitter. For reducing the jitter, the third guide can be designed to also serve as an impedance roller. In this case, for example, the upper end of the third guide is increased into a greater diameter as shown in FIGS. 13 and 14, so as to increase the inertial moment.

According to the present invention, even in the system in which the diameter of the cylinder is reduced in order to achieve a compact and lightweight construction of the device, the contact between the opposed surfaces of the tape at the guides disposed near the entrance side and exit side of the cylinder can be prevented positively and easily by the third guide. And besides, the loosening of the tape can be easily eliminated. Therefore, the tape travel performance as well as the reliability can be enhanced. Further, since the distance between the first guides 5 and 6 as well as the distance between the second guides 7 and 8 can be reduced, the angle of winding of the tape around the cylinder can be easily increased. As a result, a compact and lightweight construction of the device can be easily achieved.

The present invention can be embodied in other forms than the above-mentioned embodiments without departing from the spirit and principal features of the invention. The above-embodiments are merely examples of the present invention, and should not be construed as being limitative. The scope of the present invention is specified in the appended claims. Various modifications and changes can be made within the scope of the appended claims.

What is claimed is:

1. A tape guide mechanism for use in a recording and reproducing device in which signals are recorded on and reproduced from a tape, wound around an outer peripheral surface of a cylinder, respectively, by signal recording and signal reproducing means mounted on said cylinder, said tape guide mechanism comprising:

a pair of first guides disposed respectively at a tape entrance side and a tape exit side of said cylinder and positioned adjacent to said cylinder in a condition in which the winding of said tape around said cylinder is completed, so as to define a posture of entrance of said tape to said cylinder and a posture of exit of said tape from said cylinder, respectively;

a pair of second guides disposed adjacent to said pair of first guides, respectively, so as to change a direction of travel of said tape; and a third guide disposed between a signal recording surface side of the tape on a tape travel path, which is provided between said first guide of the tape entrance side and said second guide, and other signal recording surface side of the tape on the tape travel path, which is located from said first guide of the tape exit side to said second guide, and wherein said third guide rotates about a stationary shaft.

2. A tape guide mechanism according to claim 1, in which said third guide has a cylindrical shape.

3. A tape guide mechanism for use in a recording and reproducing device in which signals are recorded on and reproduced from a tape, wound around an outer peripheral surface of a cylinder, respectively, by signal recording and signal reproducing means mounted on said cylinder, sad tape guide mechanism comprising:

a pair of first guides disposed respectively at a tape entrance side and a tape exit side of said cylinder and positioned adjacent to said cylinder in a condition in which the winding of said tape around said cylinder is completed, so as to define a posture of entrance of said tape to said cylinder and a posture of exit of said tape from said cylinder, respectively;

a pair of second guides disposed adjacent to said pair of first guides, respectively, so as to change a direction of travel of said tape; and a third guide disposed between a signal recording surface of side of the tape on a tape travel path, which is provided between said first guide of the tape entrance side and said second guide, and other signal recording surface of the tape on the tape travel path, which is located from said first guide of the tape exit side to said second guide, said third guide being in contact with said tape only when the tape stops and spaced from the tape when the tape travels.

4. A tape guide mechanism according to claim 3, in which said third guide has a cylindrical shape.

* * * * *